United States Patent
Shin

(10) Patent No.: US 6,737,774 B1
(45) Date of Patent: May 18, 2004

(54) COOLING FAN MOTOR FOR CONDENSER HAVING DIRECT ENGAGEMENT TYPE CONNECTOR

(75) Inventor: Jae-Yong Shin, Yoosung-Gu (KR)

(73) Assignee: Kamco Co., Ltd., Cheongwon-Gun (KR)

( * ) Notice: Subject to any disclaimer, the term of this patent is extended or adjusted under 35 U.S.C. 154(b) by 0 days.

(21) Appl. No.: 10/351,971

(22) Filed: Jan. 27, 2003

(30) Foreign Application Priority Data

Dec. 12, 2002 (KR) .................................. 10-2002-0079232

(51) Int. Cl.⁷ .............................................. H02K 11/00
(52) U.S. Cl. ........................................................ 310/71
(58) Field of Search .......................... 310/71, 239, 220, 310/75 R, 68 B, 89

(56) References Cited

U.S. PATENT DOCUMENTS

| | | | | |
|---|---|---|---|---|
| 5,528,093 A | * | 6/1996 | Adam et al. ................... | 310/89 |
| 5,691,585 A | * | 11/1997 | Shoda ........................... | 310/71 |
| 5,942,822 A | * | 8/1999 | Iwata et al. .................... | 310/71 |
| 5,949,173 A | * | 9/1999 | Wille et al. ................... | 310/220 |
| 6,127,752 A | * | 10/2000 | Wiesler ....................... | 310/68 B |
| 6,201,326 B1 | * | 3/2001 | Klappenbach et al. .... | 310/75 R |
| 6,259,184 B1 | * | 7/2001 | Bender ........................ | 310/239 |
| 6,465,920 B2 | * | 10/2002 | Harita et al. .................. | 310/71 |
| 6,573,625 B2 | * | 6/2003 | Shimizu et al. ............... | 310/71 |

* cited by examiner

Primary Examiner—Gary Paumen
Assistant Examiner—James R. Harvey
(74) Attorney, Agent, or Firm—R. Neil Sudol; Henry Coleman; William Sapone

(57) ABSTRACT

The present invention relates to a cooling fan motor for a condenser having a direct engagement connector. There is provided a cooling fan motor for a condenser having a direct engagement type connector, in which a pair of engaging protrusions each having a plurality of pin engaging holes in an inner side of the same are protruded in one side and the other side of a back surface of the end cover; and a direct engagement type connector is engaged in an engaging protrusion of the end cover, and an engaging terminal is formed in an upper portion of the direct engagement type connector, and a connector leg is integrally formed in a lower portion of the engaging terminal, and a certain through hole is formed in the center portion of the same for thereby receiving a second receiving unit thereinto protruded from a back surface of a motor, and a pair of engaging members corresponding to the engaging protrusion of the end cover are formed in one side surface of the connector leg; and an end portion of each of a plurality of pins is protruded from an inner portion of the engaging terminal of the connector, and the pin is embedded in the connector leg, and the other end of each of the same is outwardly protruded through the engaging member, and when engaging the connector in the end cover, the pin contacts with the brush formed in the inner side of the motor through the engaging hole formed in an inner side of the engaging protrusion.

2 Claims, 4 Drawing Sheets

[fig 1]
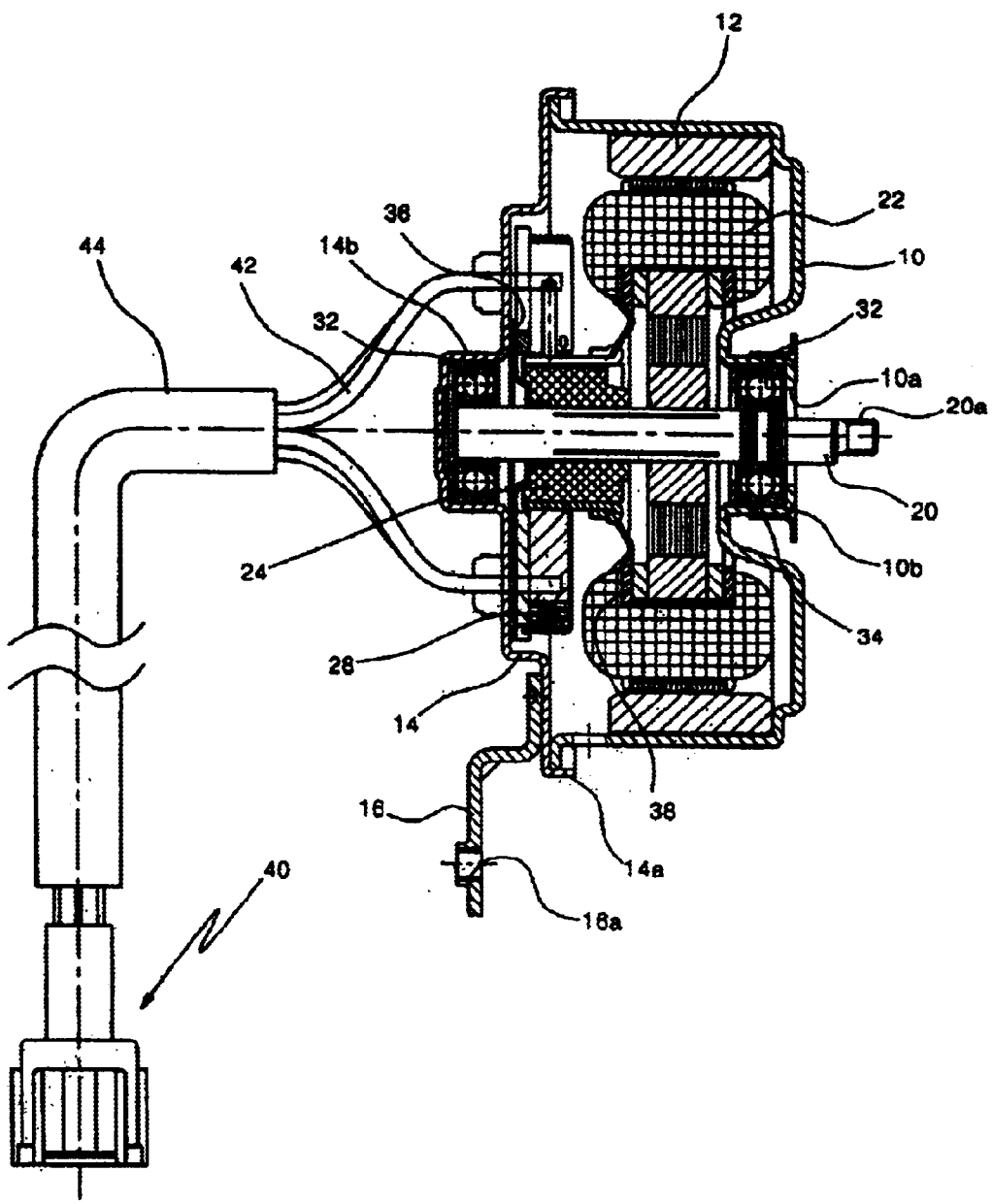
PRIOR ART

[fig 2]
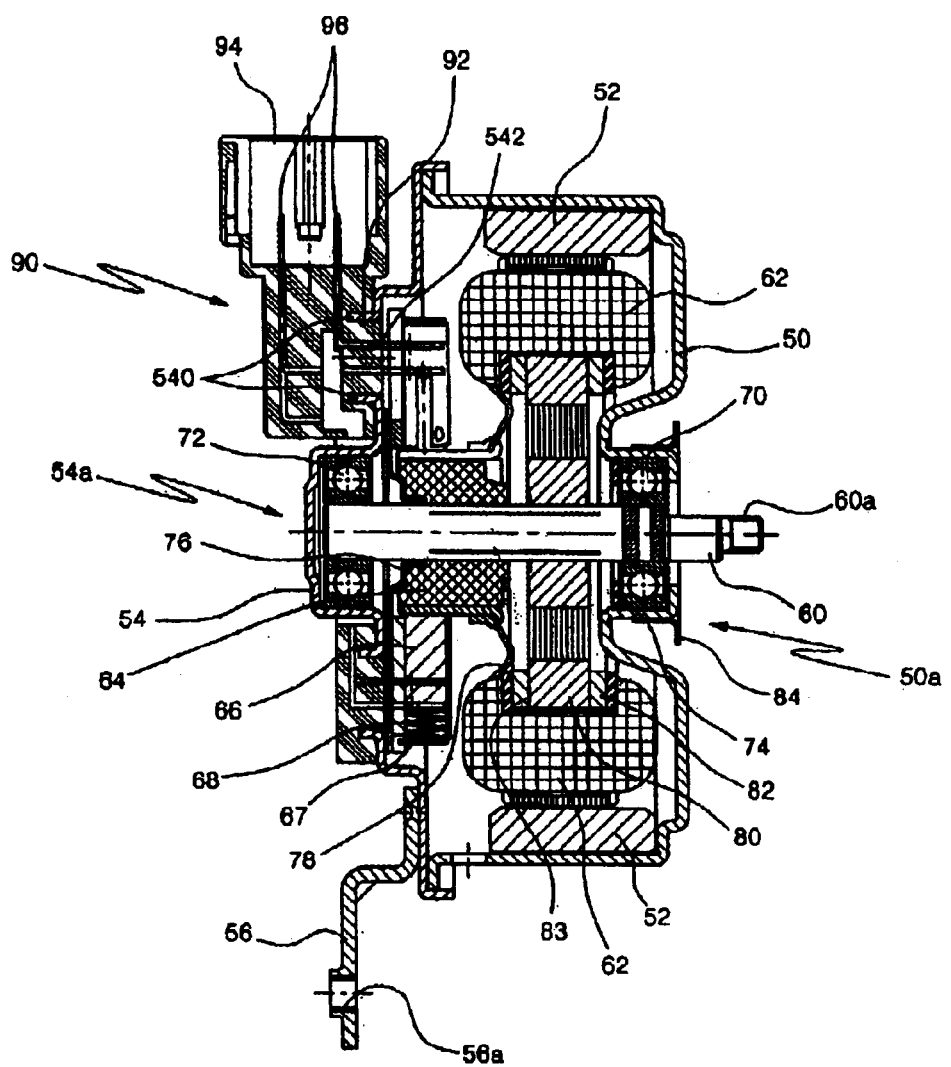

[fig 3]
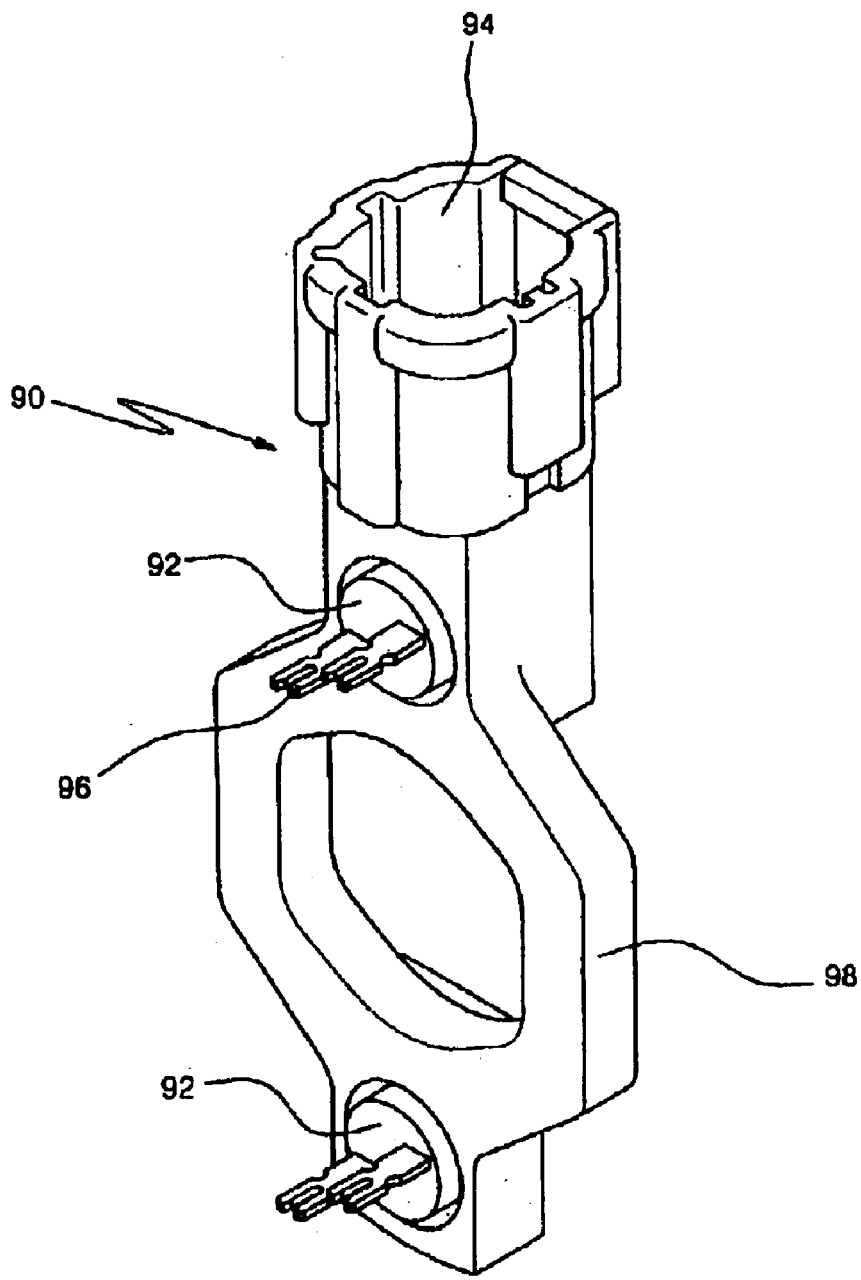

[fig 4]
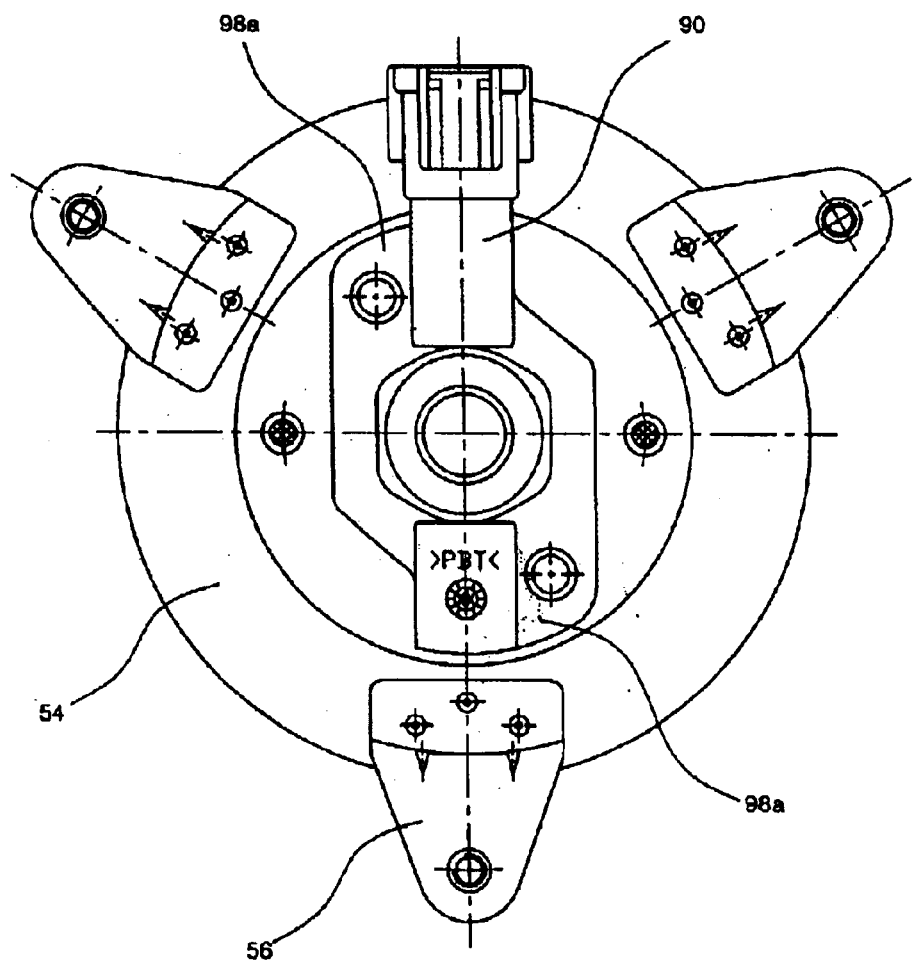

COOLING FAN MOTOR FOR CONDENSER HAVING DIRECT ENGAGEMENT TYPE CONNECTOR

BACKGROUND OF THE INVENTION

1. Field of the Invention

The present invention relates to a cooling fan motor for a condenser having a direct engagement type connector, and in particular to an improved cooling fan motor for a condenser having a direct engagement type connector which is capable of implementing an easier management of a lead line to which a power is applied for driving a motor by engaging a direct engagement type connector housing to an end cover having a bearing which is supported in such a manner that an end of an armature shaft of a cooling motor fan is rotated and minimizing a voltage drop in a lead line by decreasing the number of parts such as a cable, terminal, etc. for thereby enhancing a productivity of a motor based on the reduction of the number of parts.

2. Description of the Background Art

Generally, in order to cool a coolant which flows through a condenser by rotating a cooling fan, there is provided a motor which is capable of rotating a cooling fan.

FIG. 1 is a view illustrating a conventional condenser cooling fan motor for cooling a coolant which flows through a condenser, by rotating a cooling fan.

The conventional condenser cooling fan motor includes a housing 10 having a through hole 10a through which a shaft passes and a first receiving unit 10b which receives a first bearing 30, an end cover 14 which is engaged opposite to the housing 10 through a flange 14a and includes a second receiving unit 14b for receiving a second bearing 32 therein, an armature shaft 20 which includes one end rotatably supported by the first bearing 30 in a state that the above one end is extended through a through hole 10a of the housing and the other end which is rotatably supported by the second bearing 32, an armature 22 which is inserted onto an outer circumference of the armature shaft 20, a rectifier 24 which is provided in the armature 22 and the end cover 14, and a brush 26 which is adapted to supply a power applied from a battery to the armature 22 through the rectifier 24 in a state that the brush 26 is elastically pressurized by a spring 28.

A mounting bracket 16 having an engaging hole 16a is attached to an outer side of the end cover 14.

A magnet 12 is attached to an inner side of the housing 10 in a portion opposite to the armature 22.

In the conventional condenser cooling fan motor, when a power which is applied to the rectifier 25 through the brush 26 is supplied to the armature 22 through a wire 38, a certain rotational force occurs by a magnetic force of the magnet 12 for thereby rotating the armature shaft 20. At this time, since a cooling fan is fixed to the fan engaging portion 20a formed in an end of the armature shaft 20, the cooling fan is rotated at a high speed by a strong rotational force of the armature shaft 20, so that the coolant which flows through the condenser is cooled.

When assembling the cooling fan motor, in a state that the end cover 14 is fixed to a jig, a second bearing 32 is inserted into the second receiving unit 14b, and then an end of the armature shaft 20 in which the rectifier 24 and the armature 22 are engaged is inserted into the second bearing 32. The second bearing 32 is inserted into the other end of the same, and the housing 10 is engage using a jig for thereby completing an assembling operation.

At this time, since the armature shaft 20 is rotatably engaged using the first bearing 30 and the second bearing 32, an air gap may be formed. In the assembling line, a certain washer 34, 36 having the same size as the above air gap is inserted for thereby preventing any movement in the longitudinal direction of the armature shaft 20.

An end of the cable 44 including the lead line 42 which is adapted to apply a power to the cooling fan motor is connected with the brush 26 formed in the interior of the same through the terminal of the end cover 14 from the outside of the motor, and the other end of the same is connected with the connector 40 which is engaged to a wire harness(not shown) capable of applying a power from the battery.

However, in the thusly constituted conventional condenser cooling fan motor, since the lead line which is externally extended is connected with the terminal connected with the brush based on a certain process from the fabrication step of the motor for supplying a power to the motor, the number of the processes is increased due to the fabrication process of the motor. Therefore, the assembling nature of the motor is decreased.

In addition, the management of the lead line connected to the brush through the terminal is complicated, and the other end of the lead line extended from the rear side of the motor is connected to the connector to which the wire harness is engaged for thereby causing much inconvenience. Since there is lead line between the connector and the motor, since the power inputted through the connector is decreased because the power must flow through the lead line.

SUMMARY OF THE INVENTION

Accordingly, it is an object of the present invention to provide a cooling fan motor for a condenser having a direct engagement type connector which overcomes the problems encountered in the conventional art.

It is another object of the present invention to provide a cooling fan motor for a condenser having a direct engagement type connector which is capable of implementing an easier management of a lead line to which a power is applied for driving a motor by engaging a direct engagement type connector housing to an end cover having a bearing which is supported in such a manner that an end of an armature shaft of a cooling motor fan is rotated and minimizing a voltage drop in a lead line by decreasing the number of parts such as a cable, terminal, etc. for thereby enhancing a productivity of a motor based on the reduction of the number of parts.

In order to achieve the above objects, in a cooling fan motor having a condenser which includes a housing having an inner wall attached with a magnet, an end cover engaged opposite to the housing, an armature shaft which includes an armature in an outer circumference of the same and an end portion which is rotatably supported in a first receiving unit of the housing, and the other end is rotatably supported in a second receiving unit of the end cover by a ball bearing, a rectifier which is installed between the armature and the end cover, and a brush which is adapted to supply a power from a battery to the armature through the rectifier in a state that the brush is elastically supported by a spring, there is provided a cooling fan motor for a condenser having a direct engagement type connector, in which a pair of engaging protrusions each having a plurality of pin engaging holes in an inner side of the same are protruded in one side and the other side of a back surface of the end cover; and a direct engagement type connector is engaged in an engaging protrusion of the end cover, and an engaging terminal is formed in an upper portion of the direct engagement type connector, and a connector leg is integrally formed in a lower portion of the engaging terminal, and a certain through hole is formed in the center portion of the same for thereby receiving a second receiving unit thereinto protruded from a back surface of a motor, and a pair of engaging members corresponding to the engaging protrusion of the end cover are formed in one side surface of the connector leg; and an end portion of each of a plurality of pins is protruded from an inner portion of the engaging terminal of the connector, and the pin is embedded in the connector leg, and the other end of each of the same is outwardly protruded through the engaging member, and when engaging the connector in the end cover, the pin contacts with the brush formed in the inner side of the motor through the engaging hole formed in an inner side of the engaging protrusion.

In the present invention, a pair of reinforcing portions are formed in one side and the other side of an outer circumference of the connector leg, and the connector is engaged to the end cover using a rivet through the reinforcing portion.

BRIEF DESCRIPTION OF THE DRAWINGS

The present invention will become better understood with reference to the accompanying drawings which are given only by way of illustration and thus are not limitative of the present invention, wherein;

FIG. 1 is a cross-sectional view illustrating the whole construction of a conventional cooling fan motor for a condenser;

FIG. 2 is a cross-sectional view illustrating the whole construction of a cooling fan motor for a condenser having a direct engagement connector according to the present invention;

FIG. 3 is a perspective view illustrating a direct engagement type connector for a cooling fan motor for a condenser according to the present invention; and FIG. 4 is a rear view illustrating an engaged state of a cooling fan motor for a condenser having a direct engagement type connector according to the present invention.

| "Description of major elements of the drawings" | |
|---|---|
| 50: housing | 50a: first receiving unit |
| 52: magnet | 54: end cover |
| 54a: second receiving unit | 56: mounting bracket |
| 60: armature shaft | 62: armature |
| 64: rectifier | 66: brush |
| 68: spring | 70, 72: bearing |
| 76: retainer | 80: core |
| 82, 83: spacer | 90: direct engagement type connector |
| 92: engaging member | 94: engaging terminal |
| 96: pin | 98: connector leg |
| 98a: reinforcing unit | 540: engaging protrusion |
| 542: engaging hole | |

DETAILED DESCRIPTION OF THE PREFERRED EMBODIMENTS

The preferred embodiments of the present invention will be described with reference to the accompanying drawings.

FIG. 2 is a cross-sectional view illustrating the whole construction of a cooling fan motor for a condenser having a direct engagement connector according to the present invention, and FIG. 3 is a perspective view illustrating a direct engagement type connector for a cooling fan motor for a condenser according to the present invention.

As shown in FIG. 2, the whole construction of the cooling fan motor for a condenser having a direct engagement type connector according to the present invention will be described. The cooling fan motor for a condenser having a direct engagement type connector according to the present invention includes a housing 50 having a magnet 52 attached in an inner surface of the same, an end cover 54 which is engaged opposite to the housing 50, an armature shaft 60 which has an armature in an outer circumference and is rotatably supported in the housing 50 in which a cooling fan is fixed to the fan engaging portion 60a, a rectifier 64 which is provided between the armature 62 and the end cover 54, and a brush 66 which is adapted to supply the power from the battery to the armature 62 through the rectifier 64 in a state that the same is elastically pressurized by the spring 68.

In addition, the mounting bracket 56 in which an engaging hole 56a is formed is attached to an outer surface of the end cover 54. The housing 50 and the end cover 54 are engaged each other in opposite direction through the flange portion (not shown) in the same manner as the conventional art. In addition, the spacers 82, 83 is inserted in both sides of the core 80 in the interior of the armature 62.

An end of the armature shaft 60 is rotatably engaged with respect to the housing 50 by the first bearing which is a ball bearing 70 of a seal type, and the other end of the same is rotatably enraged with respect to the end cover 54 by the second bearing. Here, a water guide 84 is attached to an outer end portion of the first receiving unit 50a in which the first bearing is received.

The second bearing which is received in the second receiving unit 54a of the end cover 54 for thereby rotatably supporting the armature shaft 60 may be selected between a seal type ball bearing 72 or a sintered type bearing.

A gap adjusting washer 74 is inserted into the armature shaft 60 installed near the ball bearing 70, and a retainer 76 is provided between the end cover 54 and the rectifier 64.

Therefore, as an air conditioner is operated, when the power applied to the rectifier 65 through the brush 66 is supplied to the armature 62, a certain force is generated based on a magnetic force of the magnet 52 for thereby rotating the armature shaft 60. At this time, since a cooling fan is fixed to the fan engaging unit 60a formed in an end portion of the armature shaft 60, the cooling fan is rotated at a high speed based on a strong rotational force of the armature shaft 60 for thereby cooling a coolant which flows in the condenser.

The present invention is directed to implementing an easier management of the lead line which is connected with the brush through the tunnel in a back surface of the end cover for applying the power to the motor. In the direct engagement type connector adapted to the present invention, the connector which is connected with the wire harness which is adapted to receive a power from the battery and to supply to the motor is constituted in a pin type direct engagement method, so that the connector is directly connected with the motor without an additional lead line for thereby supplying the power.

FIG. 3 is a perspective view illustrating the direct engagement type connector according to the present invention. As shown in FIGS. 2 and 3, a pair of engaging protrusions 540 are formed in one side and the other side of the back surface of the end cover 54, and a pin type direct engagement connector 90 is engaged to the engaging protrusion 540.

Here, a plurality of engaging holes 542 communicating with the brush 66 in the interior of the motor are formed in the inner side of the engaging protrusion 540.

As shown in FIG. 3, in the pin type direct engagement connector 90, an engaging terminal 94 is formed in the upper portion of the same for thereby being engaged with the wire harness, and a connector leg 98 is integrally formed in the lower portion of the engaging terminal.

In addition, the connector leg 98 has holes for thereby receiving the second receiving portion which is formed in such a manner that the center portion of the same is protruded in the back surface of the motor. A plurality of pins 96 are embedded in the connector leg 98 in such a manner that an end of each of the pins is protruded from the inner side of the engaging terminal 94 for thereby guiding the flow of the alternating current.

The other end of each of the pins 96 embedded in the connector leg 98 is outwardly protruded in the direction of the front surface of a pair of engaging members 92 formed in one surface of the connector leg 98 in which the engaging protrusion 540 of the end cover 54 is inserted and engaged.

Therefore, when the direct engagement type connector is engaged to the back surface of the end cover of the motor, a pair of the engaging members 92 formed in one surface of the connector leg 98 are engaged with the engaging protrusion 540 protruded from the back surface of the end cover 54. At this time, since a plurality of pins 96 which are protruded from the front surface of the engaging members 92 are connected with the brush 66 in the motor through the engaging hole 542, the power which is externally inputted is supplied to the brush 66 in the motor through the pins 96.

Here, as shown in FIG. 4, when engaging the direct engagement type connector 90 in the back surface of the end cover 54, a reinforcing portion 98a is formed in the upper and lower portions of the connector leg 98. The reinforcing portions 98a and the end cover 54 of the motor are connected using rivets. Therefore, it is possible to implement a stable engagement therebetween.

The operation and effects of the present invention will be described.

As shown in FIGS. 2 and 3, the wire harness(not shown) adapted to supply a power externally applied from the battery is connected with the engaging terminal 94 of the connector 90, and the external power which is supplied from the battery is applied to the connector 90 through the wire harness. The power is applied to the brush 88 installed in the motor through a plurality of pins 96 installed within the connector 90 for thereby rotating the armature shaft 60.

Therefore, in the present invention, since an external power is supplied to the cooling fan motor through the direct engagement type connector, it is possible to implement an easier management of the lead line to which the power is applied for driving the motor. In addition, in the present invention, it is possible to decrease the number of parts such as cable and terminal which are used in the conventional art. Furthermore, it is possible to minimize the drop of voltage which occurs in the lead line.

In addition, in the present invention, it is possible to enhance the productivity of the motor based on the decrease of the number of parts, so that the fabrication cost based on the motor fabrication is decreased.

As described above, according to the cooling fan motor for a condenser having a direct engagement type connector, and the pin type direct engagement connector housing is engaged in the back surface of the end cover into which the bearing is inserted in such a manner that an end of the armature shaft of the cooling motor is rotatably supported. Therefore, in the present invention, it is possible to implement an easier management of the lead line to which a power is applied for driving the motor. In addition, it is possible to decrease the number of the parts such as cable and terminal which are used in the conventional art for thereby minimizing the drop of the voltage which occurs in the lead line. Furthermore, it is possible to enhance the productivity of the motor based on the decreased number of the parts, so that the fabrication cost based on the motor fabrication is significantly decreased.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a cooling fan motor having a condenser which includes a housing having an inner wall attached with a magnet, an end cover engaged opposite to the housing, an armature shaft which includes an armature in an outer circumference thereof and an end portion which is rotatably supported in a first receiving unit of the housing, and the other end is rotatably supported in a second receiving unit of the end cover by a ball bearing, a rectifier which is installed between the armature and the end cover, and a brush which is adapted to supply a power from a battery to the armature through the rectifier in a state that the brush is elastically supported by a spring, a cooling fan motor for a condenser having a direct engagement type connector, in which a pair of engaging protrusions each having a plurality of pin engaging holes in an inner side thereof are protruded in one side and the other side of a back surface of the end cover; and the direct engagement type connector is engaged in an engaging protrusion of the end cover, and an engaging terminal is formed in an upper portion of the direct engagement type connector, and a connector leg is integrally formed in a lower portion of the engaging terminal, and a through hole is formed in the center portion thereof for thereby receiving a second receiving unit thereinto protruded from a back surface of a motor, and a pair of engaging members corresponding to the engaging protrusion of the end cover are formed in one side surface of the connector leg; and an end portion of each of a plurality of pins is protruded from an inner portion of the engaging terminal of the connector, and the pin is embedded in the connector leg, and the other end of each thereof is outwardly protruded through the engaging member, and when engaging the connector in the end cover, the pin contacts with the brush formed in the inner side of the motor extend through the engaging hole formed in an inner side of the engaging protrusion.

2. The motor of claim 1, wherein a pair of reinforcing portions are formed in one side and the other side of an outer circumference of the connector leg, and the connector is engaged to the end cover using a rivet through the reinforcing portion.

* * * * *